United States Patent [19]

Leedke et al.

[11] Patent Number: 4,952,070

[45] Date of Patent: Aug. 28, 1990

[54] DIGITAL DATA CODING TECHNIQUE

[75] Inventors: David L. Leedke, Melbourne; Fred J. Studenberg, W. Melbourne, both of Fla.

[73] Assignee: Rockwell International Corporation, El Segundo, Calif.

[21] Appl. No.: 258,923

[22] Filed: Oct. 17, 1988

[51] Int. Cl.$^5$ ............................................. H04J 3/08
[52] U.S. Cl. ................................. 370/110.4; 370/55; 375/20
[58] Field of Search ................... 370/100, 55, 110.4; 375/20, 4, 17

[56] References Cited

U.S. PATENT DOCUMENTS

| | | | |
|---|---|---|---|
| 4,071,692 | 1/1978 | Weir et al. | 375/17 |
| 4,131,761 | 12/1978 | Giusto | 375/20 |
| 4,387,460 | 6/1983 | Boutmy et al. | 370/110.4 |
| 4,408,189 | 10/1983 | Betts et al. | 375/20 |
| 4,408,325 | 10/1983 | Grover | 375/20 |
| 4,414,663 | 11/1983 | Panzer | 370/110.4 |
| 4,434,485 | 2/1984 | Huffman et al. | 370/55 |
| 4,628,493 | 12/1986 | Nelson et al. | 370/100 |
| 4,631,721 | 12/1986 | Ono et al. | 370/100 |

OTHER PUBLICATIONS

"Single Channel Drop and Insert", Telecommunications Applications, Canadian Marconi Co. 9/1973.
'PCM and Digital Transmission Systems, by Frak F. E. Owen, pp. 177-180 §8.2.1 and pp. 213-229 §9.1 and §9.4.

Primary Examiner—Douglas W. Olms
Assistant Examiner—Min Jung
Attorney, Agent, or Firm—Gregory G. Williams; M. Lee Murrah; H. Fredrick Hamann

[57] ABSTRACT

Digitial audio data transmission technique which utilizes time division multiplexed messages, for transmitting information from point A to point B, while having intermediate points therebetween for augmenting the information without completely demodulating and remodulating the entire signal at each intermediate point. The technique comprises generating a clock signal having a plurality of pulses therein which are separated by a plurality of expansion regions. The expansion regions are utilized for containing the data information and the presence or absence of a pulse in the expansion region represents the message. Initially, the clock information and a message information is transmitted from point A along with a portion of the transmission containing clock information only and no message information. A remote terminal coupled by a directional coupler at one of the intermediate points monitors the message and transmits a message signal which is written on the existing signal during the portion of the transmission which has been previously assigned to that remote terminal, the initial transmission continues irrespective of any failure of the remote terminal to receive or transmit its augmentation to that message. The augmented message is later received at point B without having a complete demodulation and remodulation of the entire message at the point that the initial transmission was augmented.

2 Claims, 2 Drawing Sheets

CLOCK + 0000 MESSAGE

CLOCK + 1010 MESSAGE

DIGITAL DATA CODING TECHNIQUE

FIELD OF THE INVENTION

This invention generally relates to telecommunications, and more particularly, is concerned with digital audio data encoding techniques, and even more particularly, relates to digital audio data encoding techniques which allow a message being transmitted along a transmission line to be augmented at several intermediate points therebetween.

BACKGROUND OF THE INVENTION

In the past, if time division multiplex messages were to be transmitted from point A to point B, with the capability of having additions made to the data at intermediate points therebetween, a series of transmitters and receivers would be strung from point A through each of the intermediate points to point B, with each intermediate point having a transmitter and receiver, where the message would be demodulated to recover the required channel and timing information. Then the message would be completely remodulated, on a new carrier with the new channel added. A simple transmission code, similar to the alternate mark inversion (AMI) or bipolar code, would typically be used.

While such designs and such transmission codes have enjoyed considerable use in the past, they have several serious drawbacks. First of all, the prior art AMI transmission code does not easily allow adding new data at intermediate points without completely demodulating the message and modulating a new message with the new data added. Another problem is that the transmitter and receiver, which are associated with each intermediate point, are typically connected in series along the transmission line. This results in a reliability problem of the system. The reliability of the system is dependent upon the operation of each transmitter and receiver and if one transmitter or receiver fails the entire system is unable to function.

Consequently, there exists a need for improvements in digital audio data communication techniques which allow for data transmission from A to B, with many intermediate points for adding data therebetween, which technique does not require the complete demodulation and remodulation of the entire signal at each intermediate point. Also, a need exists for a technique which allows for a transmitter or receiver, at any intermediate point, to fail and still allow the overall data transmission system to operate.

OBJECTS OF THE INVENTION

It is an object of the present invention to provide a highly reliable digital data transmission technique.

It is a feature of the present invention to transmit digital data signals along a transmission line, with several intermediate points along the line for data input and output, without the need for complete demodulation and remodulation of the entire data message at each intermediate point.

It is an advantage of the present invention that if a single transmitter or receiver, which is associated with an intermediate point along the transmission line, fails to operate the entire message is not occluded.

SUMMARY OF THE INVENTION

The present invention provides a digital data transmission technique which is designed to satisfy the aforementioned needs, produce the earlier propounded objects, include the above described features and achieve the already articulated advantages. The invention is carried out in a "drop and insert—less" technique, in the sense that no "drop and insert" techniques are utilized. Such techniques typically require terminating the transmission line at each intermediate point, demodulating the entire message to recover the required channel and timing information, then completely modulating a new carrier with the new channel added. Each intermediate point in such a design is effectively a complete receiver and transmitter for the entire message on the transmission line and its removal or failure will disrupt the entire transmission line.

The present invention, instead, uses a new digital data transmission coding technique which allows remote terminals, at the intermediate points, to add new data while being coupled to the transmission line by a passive device, such as a directional coupler. Because the directional coupler provides high isolation to the transmission line, the main transmission line continues to operate even after a failure in any remote terminal, at any intermediate location.

Accordingly, the present invention relates to new digital data transmission technique which includes a new digital data transmission code which includes clock information and also has the capability of adding new data along the transmission line by remote terminals at intermediate points. The new digital data transmission code includes message information, which is initially transmitted all as zeros, at certain pre-assigned intervals in the message, but allowing for changes to be made from the zeros to ones, at intermediate points along the transmission line, by remote terminals which transmit information so as to change the resulting message from zeros into ones.

BRIEF DESCRIPTION OF THE DRAWINGS

The invention may be more fully understood by reading the following description of a preferred embodiment of the invention in conjunction with the appended drawings wherein.

DETAILED DESCRIPTION

Figure 1:
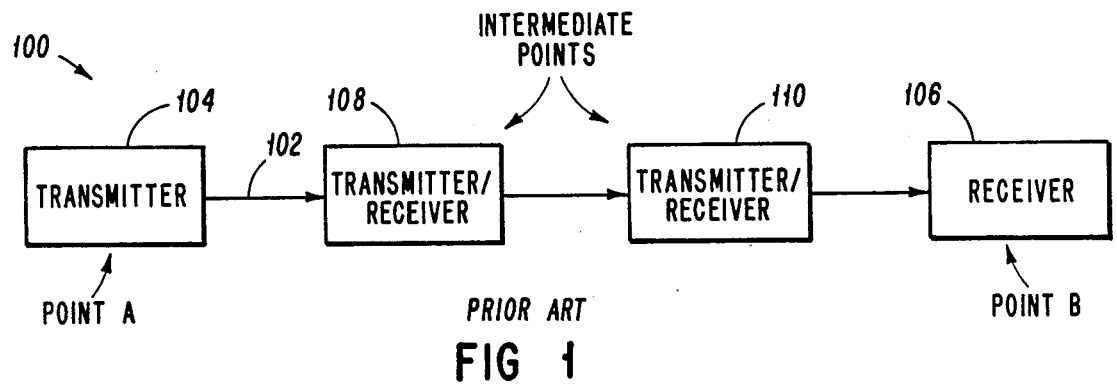
FIG. 1 is schematic representation of a typical digital data transmission system, of the prior art, which includes a group of transmitters and receivers connected in series by several transmission lines.

Now referring to FIG. 1, there is shown a digital data transmission system, of the prior art, generally designated 100. System 100 is shown having a transmission line 102 extending from transmitter/receiver 104, at point A, to transmitter/receiver 106, at point B, with several intermediate transmitters and receivers, interposed therebetween for augmenting the message from A to B. Typically, an AMI code would be used to encode the message period. Such a code is well known in the art and is discussed with other known codes in section 8.2.1 on pages 177–180 and sections 9.1 through 9.4 on pages 213 through 229 of PCM and Digital Transmission Systems, by Frank F. E. Owen, published by McGraw-Hill, Inc of New York, N.Y. in 1982, these pages are hereby incorporated herein by this reference.

Figure 2:
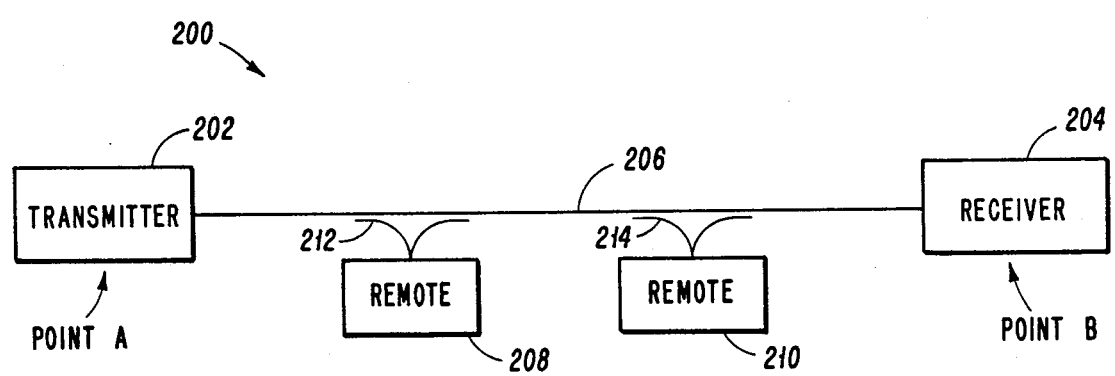
FIG. 2 is a schematic representation of a preferred embodiment of the present invention, which shows a audio management unit connected to a distant receiver unit, by a single transmission line, with several remote terminals disposed at intermediate points therebetween.

Now referring to FIG. 2, there is shown a digital data transmission system of the present invention, generally designated 200 with a transmitter 202, at point A, which is connected to receiver 204, at point B, by transmission line 206. Remote terminals 208 and 210 are coupled to transmission line 206 by directional couplers 212 and 214, respectively. Transmitter 202 transmits a signal having a clock signal and message information embedded therein.

Figure 3:
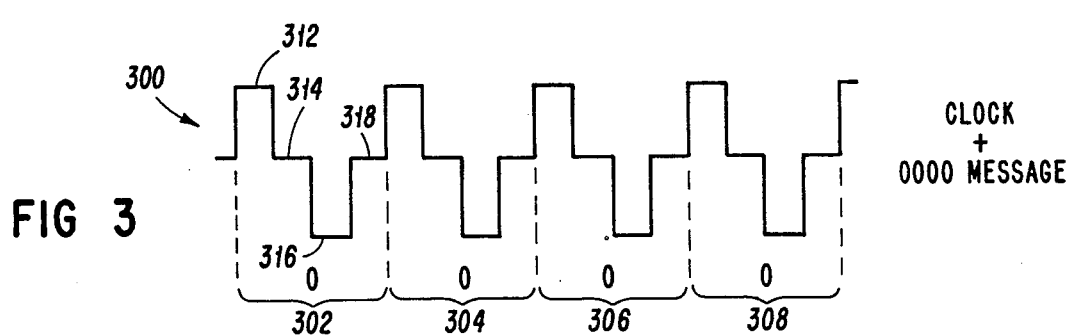
FIG. 3 is a schematic representation of a signal wave form of the encoding technique of the present invention which includes the clock information and a 0000 message.

Now referring to FIG. 3, there is shown a digital clock and data signal, of the present invention, generally designated 300, which is shown divided into a first time interval 302, a second time interval 304, a third time interval 306 and a fourth time interval 308. During firs time interval 302, the pulse wave form is represented by a initial positive rectangular pulse 312 followed by a first flat extension region 314, which is followed by a negative rectangular pulse 316 which is followed by a second flat extension region 318. Second time interval 304, third time interval 306 and fourth time interval 308 are identical in all respects to first time interval 302. The wave form 300 includes both clock information and digital data information. The digital data information of wave form 300 is completely zeros. Now referring to FIG. 2, transmitter 202 transmits a clock and zero data message wave form such as wave form 300 (FIG. 3). Remote terminals 208 and 210 are able to detect the wave form 300 as it progresses along transmission line 206 to receiver 204. Remote terminals 208 and 210 are capable of hanging the digital data message information from zeros to ones and thereby add additional data which will be received by the receiver 204.

Figure 4:
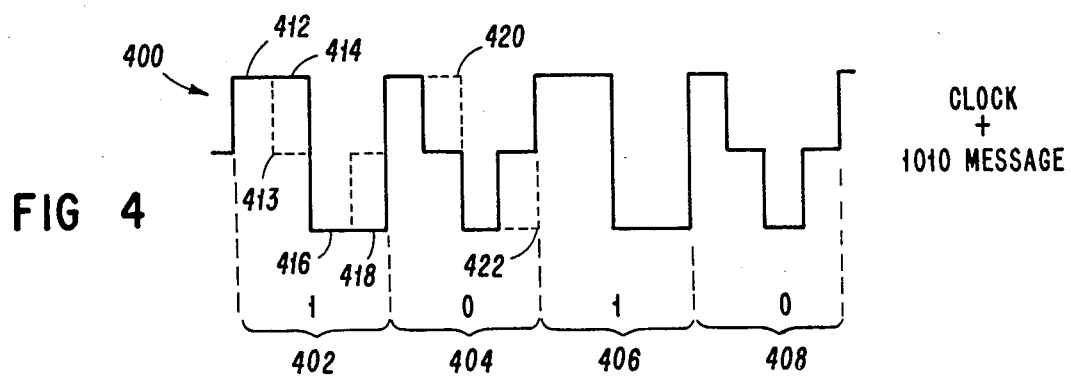
FIG. 4 is a schematic representation of a signal wave form of the encoding technique of the present invention, in which the message has been augmented to be a ·1010 message.

Now referring to FIG. 4, there is shown a digital clock and data message wave form of the present invention, generally designated 400. Have form 400 is shown with the included clock information with a 1010 data message. Have form 400 is divided into a first augmented time interval 402, a second augmented time interval 404, a third augmented time interval 406 and a fourth augmented time interval 408. During the first augmented time interval 402, which corresponds to the first time interval 302 (of FIG. 3) the wave form 400 has been changed from a zero data message to a one data message by changing the flat extension region 314 (FIG. 3) to an elevated rectangular pulse 414. In more detail, the first augmented time interval 402 consists of an "extended" positive rectangular pulse which includes a first half pulse 412 followed by a second half pulse 414. The dotted line 413 represents the wave form during the first time interval 302 (of FIG. 3). The wave form 400 during the first augmented time interval 402 then exhibits a negative rectangular pulse having a first half pulse 416 and a second half rise 418. First half 416 corresponds to the negative rectangular pulse 36 (FIG. 3). The dotted line 417 corresponds to the wave form 300 during time interval 302 (FIG. 3). It can be clearly seen that the wave form 400 during first augmented time interval 402, which represents a digital one signal, is identical to the wave form 300 during time interval 302 (FIG. 3) except that the initial rectangular positive pulse 312 and the negative rectangular pulse 316 (FIG. 3) have been "extended" in to and over the extension region and now represent a digital one. Second augmented time interval 404, which is a digital zero message, corresponds to the second time interval 304 (FIG. 3). Dotted lines 420 and 422 are included to highlight the difference between a zero message of interval 404 and the one message of interval 402. The dotted liens 420 and 422 represent the waveform that would be present if interval 404 had a one message. This time interval includes both the clock information and the zero data message information without alteration. The third augmented time interval 406, which corresponds to a digital one message, is identical to the signal during the first augmented time interval 402 and represents an "extension" of the wave form 300 during third time interval 306 (FIG. 3). Similarly, the fourth augmented time interval 408 of the wave form 400 represents a zero digital signal which corresponds to the wave form 300 during the fourth time interval 308 without change.

Figure 5:
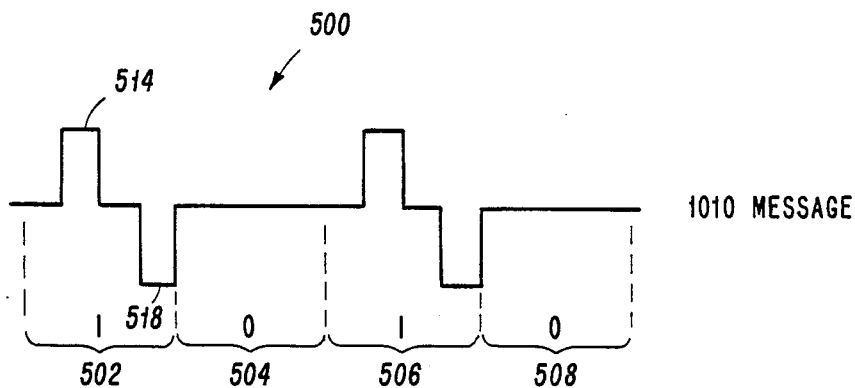
FIG. 5 is a schematic representation of a signal waveform of the encoding technique of the present invention, which would typically be transmitted by an intermediate remote terminal in order to "extend" the signal of FIG. 3 into the signal of FIG. 4.

Now referring to FIG. 5, there is shown a digital data message waveform of the present invention, generally designated 500. Waveform 500 is representative of a waveform transmitted by a remote terminal 208, or 210 (FIG. 2). The waveform 500 is chosen to represent the remote transmission that would result in transforming or "extending" waveform 300 (FIG. 3) into waveform 400 (FIG. 4).

Waveform 500 is divided into a first remote time interval 502, a second remote time interval 504, a third remote time interval 506 and a fourth remote time interval 508. First remote time interval 502 is shown having a positive rectangular pulse 514 and a negative rectangular pulse 518. Positive rectangular pulse 514, when combined with positive rectangular pulse 312 (FIG. 3) forms a waveform similar to the positive rectangular waveform produced pulses 412 and 414 (FIG. 4). Similarly, negative rectangular pulse 518, when combined with negative rectangular pulse 316 (FIG. 3), forms the negative rectangular pulse formed by pulses 416 and 418 (FIG. 4). Consequently, the zero of first time interval 302 (FIG. 3) is changed or "extended" in to the first augmented time interval 402 (FIG. 4) by being impressed upon by the waveform of remote time interval 502.

The waveform shown during remote time interval 504 is flat signal and as such, when combined with the signal during the first time interval 304 (FIG. 3), results in the unchanged waveform of the second augmented time interval 404 (FIG. 4). Similarly, the data message waveform of the third remote time interval 506 is similar to the waveform of the first remote time interval 502 and the fourth time remote interval 508 is similar to the second remote time interval 504.

In operation, the transmitter 202 (FIG. 2) transmits a digital signal similar to the wave form 300 (FIG. 3)

which includes both clock information and zero digital message information along transmission line 206 to receiver 204. Transmitter 202 can also transmit "one" digital information to receivers in remotes 208, 210. Transmitter 202 typically transmits "zero" digital information during intervals which are pre-assigned for augmentation of the message by remotes 208 and 210. Remote terminal 208, which is coupled to transmission line 206 by directional coupler 212, is able to augment the signal transmitted by transmitter 202 by impressing additional information thereon. Typically, the signal which is being transmitted down transmission line 206 is remotely sensed through the directional coupler 212 by remote terminal 208. The signal then can be altered to one that more resembles wave form 400 of FIG. 4, by extending the zero signal into the extension region, and thereby changing the zero to a one.

However, if for some reason remote terminal 208 or directional coupler 212 fail to operate, the signal which corresponds to wave form 300 (FIG. 3), will continue to receiver 204 without occlusion by the inoperable remote terminal 208. Similarly, the remote terminal 210, which is coupled to the transmission line 206 by directional coupler 214, may augment the wave form as it passes along the transmission 206 and likewise, in the event of a remote terminal 210 failure the signal along transmission 206 is not occluded from reaching transmitter/receiver 204.

It is understood by persons having skill in the art, that the transmission of all the signals, herein described, may be on transmission lines which are either electrical conductors or optical fibers. The transmitters, receivers and directional couplers which are utilized in either approach are known in the art and are a matter of the designers preference. However, it is suggested that when electrical conductors are used as transmission lines, that it may be preferable to use signals having both positive and negative pulses.

Figure 6:
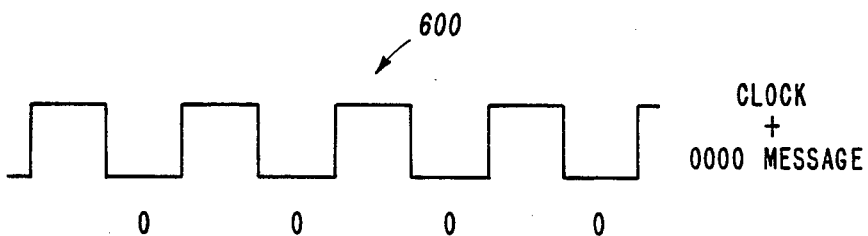
FIG. 6 is a schematic representation of a signal waveform which utilizes only positive pulses and extension regions, which represents a 0000 message.

Now referring to FIG. 6 there is shown a signal waveform, generally designated 600, which may be preferred for fiber optic transmissions. Waveform 600 shows clock signals and a 0000 data message.

Figure 7:
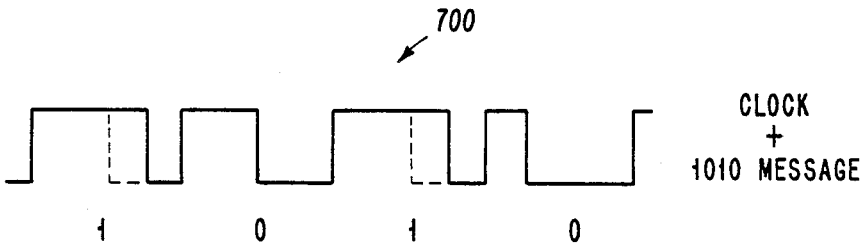
FIG. 7 is a schematic representation of a signal waveform, having a 1010 message.

Now referring to FIG. 7 there is shown a signal waveform, generally designated 700, which shows the waveform 600 (FIG. 6) after it has been augmented to a 1010 message. The dotted lines show the waveform 600 (FIG. 6) before being augmented.

It is thought that the digital data encoding technique of the present invention, and many of its attended advantages will be understood from the foregoing description, and it will be apparent that various changes may be made in the form, construction and arrangement of the parts thereof without departing from the spirit and scope of the invention, or sacrificing all their material advantages, the forms herein before described being merely or merely preferred or exemplary embodiments thereof.

We claim:

1. A time division multiplex message transmission technique, comprising the steps of:
    a. transmitting, from a first location, a clock signal without a dc component, having a central reference level and having a plurality of positive pulses, with respect to the central reference level, each positive pulse being separated by a negative pulse, with respect to the central reference level, and a plurality of flat extension regions disposed at the central reference level;
    b. monitoring the clock signal, at a second location, which is spatially distinct from the first location;
    c. generating a message signal, at the second location, by transmitting either positive or negative augmentation pulses to be combined with the extension region thereby changing the flat extension regions into either positive pulses or negative pulses, depending upon the augmentation pulses transmitted; and
    d. receiving the clock and message signals at a third location, which is spatially distinct from both the first and second locations;
    whereby, a signal is transmitted from the first location to the third location with an additional signal being added at a second location.

2. A time division multiplex message transmission technique of claim 1 wherein the clock signals with the positive pulses, negative pulses, and extension regions are arranged so that the clock signal has a plurality of clock cycles, with each clock cycle having a positive pulses followed by a flat extension region which is followed by a negative pulse which is followed by a flat extension region.

* * * * *